April 16, 1957 H. H. REDIESS ET AL 2,788,605
FISHING SINKERS
Filed July 5, 1955
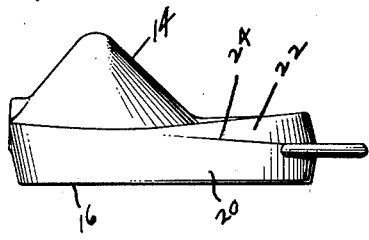
FIG_1
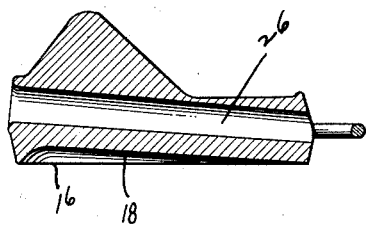
FIG_3
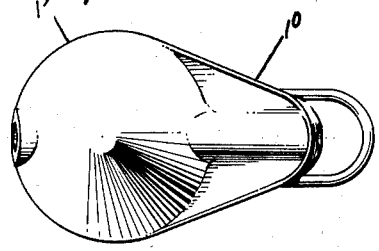
FIG_2
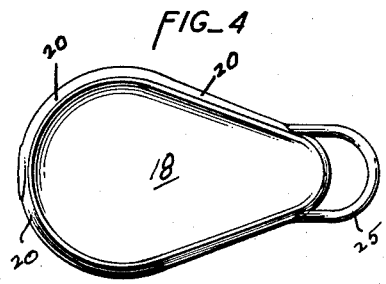
FIG_4
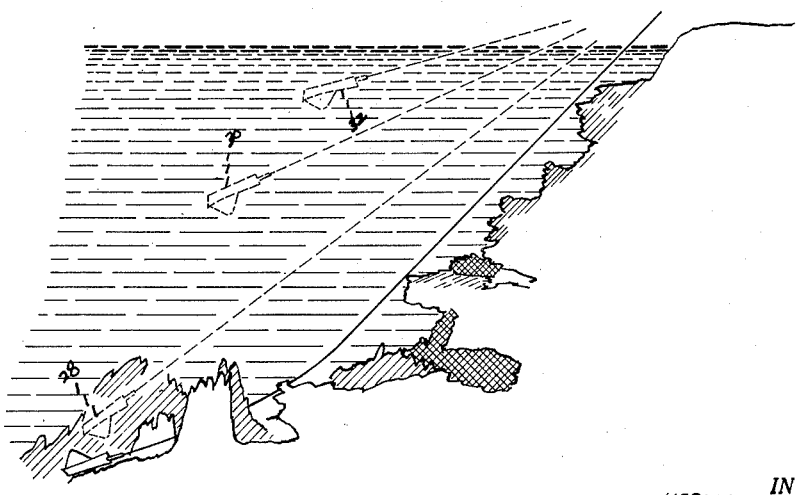
FIG_5
INVENTORS
HERMAN H. REDIESS
HERMAN A. REDIESS
BY
ATTORNEYS

2,788,605

FISHING SINKERS

Herman H. Rediess and Herman A. Rediess,
Alameda, Calif.

Application July 5, 1955, Serial No. 519,866

2 Claims. (Cl. 43—43.1)

This invention relates to fishing sinkers, and more particularly to improvements in fishing sinkers, specifically adapting the same for use in coastal waters, heavy tides, and swift running streams.

The essential object of the invention is to provide a fishing sinker which will hold its position, i. e., will not drift, in turbulent waters, and which is so shaped and proportioned as to reduce to a minimum the possibilities of the sinker becoming irretrievably snagged during either movement along the bottom of the body of water or when it is being retrieved by take-up of the line.

A further object of the invention is to provide a sinker which: is affected to a minimum degree by the action of the air, or even relatively strong winds, during casting, and which therefore can be accurately cast; which will hold the bottom even in turbulent waters and yet will not become snagged during movement over the bottom; and which upon being retrieved will be acted upon by the water in such manner that it will be moved more upwardly than horizontally, thereby reducing the possibilities of it becoming snagged in underwater growth, etc., during retrieval.

These and other objects and advantages of the invention will be apparent from the following description taken in conjunction with the drawing forming a part of this specification, and in which:

Fig. 1 is a view in side elevation of the sinker;

Fig. 2 is a top plan view of the sinker of Fig. 1;

Fig. 3 is an axial sectional view through the sinker of Fig. 1;

Fig. 4 is a bottom plan view of the sinker of Fig. 1; and

Fig. 5 is an environmental view which shows in solid outline a typical position of the sinker at the bottom of a body of water, and which shows in dotted outline a normal positional sequence of the sinker during the course of its being retrieved.

With reference to the drawing, the sinker, which is preferably molded out of lead, is provided, in plan form (Figs. 2 and 4), with a prow-shaped forward portion 10 and with a substantially semi-circular rearward portion 12. At one side of the rearward portion 12, although it extends slightly into the forward portion 10, is a prominent and sharply defined protuberance 14 which may be described as being generally conical in form. The other side of the sinker is comprised of a peripheral lip 16 which becomes progressively greater in height from the forward portion of the sinker to the rearward portion, and which encloses a substantially flat surface 18 which is slightly inclined with respect to the plane in which the peripheral lip 16 resides. The peripheral margin of surface 18 is arcuately faired into the lip 16. The lateral surface of the sinker is, in effect, comprised of two differently oriented portions, namely, the predominant peripheral portion 20 which extends from the leading end of the forward portion around the sinker and back to the leading end of the forward portion, the same being inclined upwardly and outwardly with respect to the peripheral lip 16, and portion 22 which defines the upper part of the lateral surface of the forward portion 10, the same being inclined upwardly and inwardly with respect to the line of demarcation 24 between surface portions 20 and 22.

A U-shaped line attachment member 25 is cast into the forward portion 12 of the sinker during the casting operation, and the sinker is further provided with a cylindrical passageway 26 which extends through the sinker in a direction substantially parallel to the plane in which surface 18 resides. The passageway 26 is provided so that, if desired, the sinker may be slidably secured to the line.

The distribution of the weight of the body of the sinker is such as to locate the center of gravity of the sinker, with reference to Fig. 1, slightly above the lateral surface portion 20 and somewhat to the right of the tip of the generally conical protuberance 14.

With reference to Fig. 5, relative to the mode of operation of the sinker, when it is cast into the water, it assumes the inverted position indicated, due to its shape and the disposition of its center of gravity, and settles to the bottom. After the side surface of the conical protuberance 14 comes to rest on the bottom, the tide or current action of the water rolls the sinker over so that the surface 18 thereof is disposed toward the bottom, as shown in the solid outline representation of the sinker in Fig. 5. In this position, the weight and shape of the sinker, together with its cup-like underside, serve to effectively maintain the sinker in position against drifting. The streamlined shape o fthe sinker in this non-drift position prevents the sinker from being overturned under the action of the water. At the same time, the shape of the sinker is such that it will cam itself free of entanglement with rocks, undergrowth, etc. in the event that it is slowly dragged over the bottom by manipulation of the line.

Reeling of the line inwardly to retrieve the sinker causes the sinker to be lifted from the bottom, at which time it turns over, due to its shape and weight distribution, so that the conical protuberance 14 is pointed downwardly. Further retrieving action causes the sinker to be moved upwardly through the dotted line positional sequence 28, 30 and 32 with a planing action, with the vertical component of movement being greater than the horizontal component of movement. This lifting action of the sinker tends to prevent the sinker from being entangled in seaweed, etc., as it would tend to be if it were moved more horizontally than vertically upon being retrieved.

Retrieving tests, conducted in clear water and with a colored die material applied to the sinker, indicate that when the sinker is retrieved rapidly the forward end thereof is tipped upwardly, as shown in Fig. 5, and the conical protuberance 14 divides the water travelling under the sinker and forces this water up and around the side of the sinker to the top, or cup-shaped, side thereof. Such tests indicate that the amount of water that consequently travels over the cup-shaped side is greater than the amount of water that travels under the sinker in the same period of time. This produces a reduced pressure condition at the upper, or cup-shaped, side of the sinker, and this materially enhances the lifting action which is imparted to the sinker by its travel through the water.

The formation of the peripheral side surface of the sinker promotes the flow of the water upwardly and over the cup-shaped side of the sinker, thus contributing to the decreased pressure condition tending to vertically lift the sinker.

What is claimed is:

1. A fishing sinker comprising a body having, in plan form, a prow-shaped forward portion having a leading end and a substantially semicircular rearward portion having a trailing end, a sharply defined and substantially conical bulky protuberance extending from one side of said rearward portion, and a recessed and substantially planar surface the outer edges of which are defined by a peripheral lip forming the margin of the other side of said forward and rearward portions, said surface extending from the leading end of said forward portion to substantially the trailing end of said rearward portion.

2. A fishing sinker comprising a body having, in plan form, a prow-shaped forward portion having a leading end and a rearward portion substantially in the form of a semi-circle having a trailing end, with the arc of said semi-circle defining the end of said rearward portion, a sharply defined and substantially conical bulky protuberance disposed at one side of said body and extending from said rearward portion, and a recessed and substantially planar surface the outer edges of which are defined by a peripheral lip forming the margin of the opposite side of said body, said surface being inclined slightly inwardly of said body in that direction going from the forward portion to the rearward portion and extending from the leading end of said forward portion to substantially the trailing end of said rearward portion.

References Cited in the file of this patent

UNITED STATES PATENTS

| | | |
|---|---|---|
| 2,481,707 | Young | Sept. 13, 1949 |
| 2,522,191 | Pillow | Sept. 12, 1950 |
| 2,554,216 | Scott | May 22, 1951 |

FOREIGN PATENTS

| | | |
|---|---|---|
| 24,502 | Great Britain | 1904 |